United States Patent [19]

Beecroft

[11] 3,896,495

[45] July 22, 1975

[54] MECHANICALLY ISOLATED TRANSDUCER HEAD WITH SPRING LOADED ARM FOR FLYING

[75] Inventor: Harold James Beecroft, Minneapolis, Minn.

[73] Assignee: Control Data Corporation, Minneapolis, Minn.

[22] Filed: Feb. 25, 1974

[21] Appl. No.: 445,410

[52] U.S. Cl. .................................. 360/103; 360/105

[51] Int. Cl.$^2$ .........G11B 5/60; G11B 17/32; G11B 21/20; G11B 5/54

[58] Field of Search ........... 360/103, 104, 109, 105; 248/204

[56] References Cited

UNITED STATES PATENTS

| | | | |
|---|---|---|---|
| 3,151,319 | 9/1964 | Mans | 360/103 |
| 3,310,792 | 3/1967 | Groom et al. | 360/103 |
| 3,368,210 | 2/1968 | Zinmer | 360/103 |
| 3,412,384 | 11/1968 | Anderson | 360/103 |
| 3,489,381 | 1/1970 | Jones et al. | 248/204 |
| 3,612,775 | 10/1971 | Miller | 360/103 |

*Primary Examiner*—Raymond F. Cardillo, Jr.
*Attorney, Agent, or Firm*—Edward Schwarz; Joseph Genorese

[57] ABSTRACT

Apparatus for mounting a magnetic transducing head assembly on a head arm for positioning the head to allow it to fly above a moving recording surface. The head assembly is allowed to rotate independently about two separate axes, both parallel to the recording surface, and translate normal to the recording surface, and thereby compensate for deviations from the ideal position of the recording surface. It is held rigidly as to the rotation about an axis normal to the recording surface and translation parallel to the recording surface. The mount preferably comprises a thin gimbal sheet providing the specified stiffnesses and flexibility to the head mount. A spring load arm applies load to the head assembly to balance the force of the air bearing and position the head adjacent the recording surface, by distorting the gimbal sheet. A lifting arm is attached to the head arm and can be used to remove the spring load arm from the head assembly and directly lift the head or allow it to be moved by the resilience of the gimbal sheet, to a position spaced apart from the recording surface.

5 Claims, 9 Drawing Figures

FIG. 1a
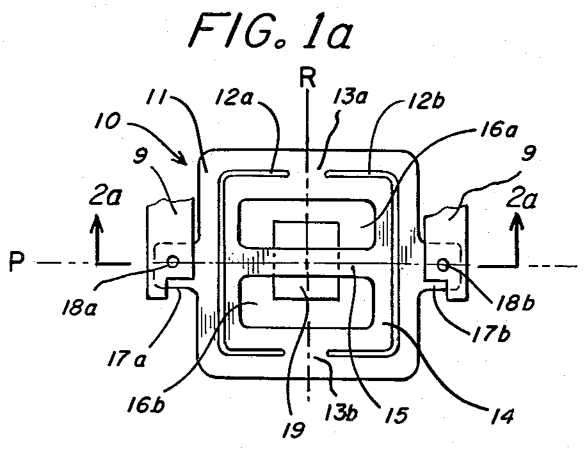
FIG. 2b
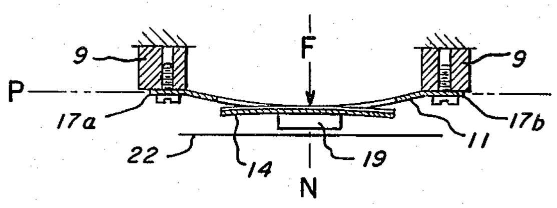
FIG. 2c
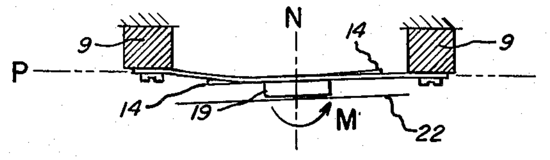
FIG. 1b
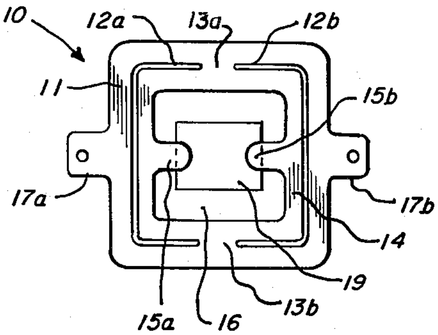
FIG. 2a
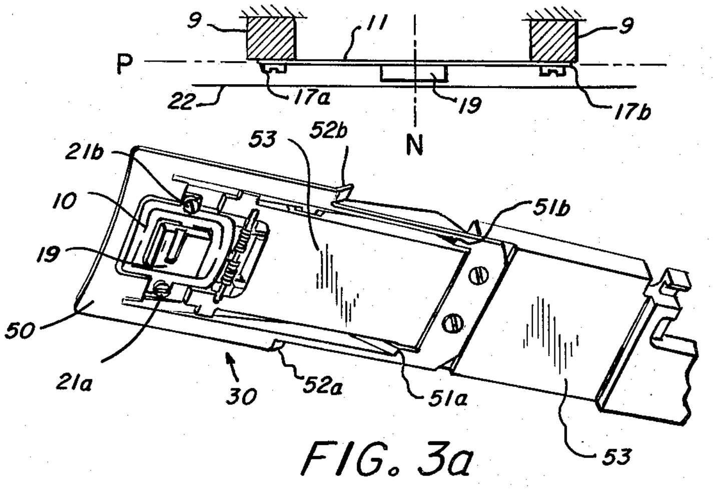
FIG. 3a
FIG. 3c
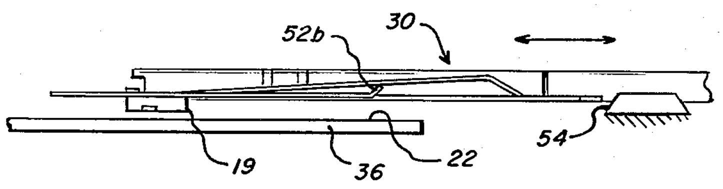
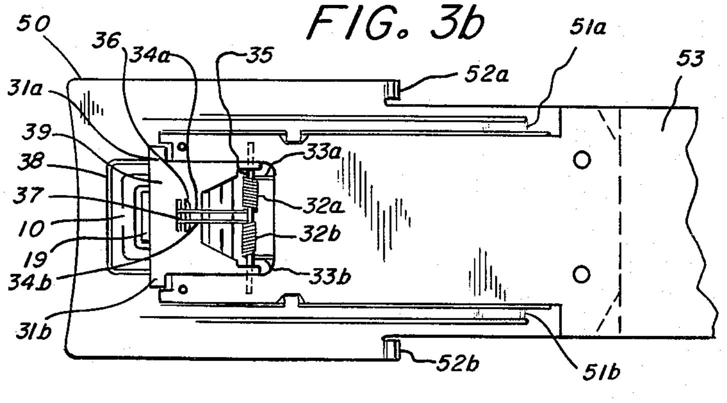
FIG. 3b
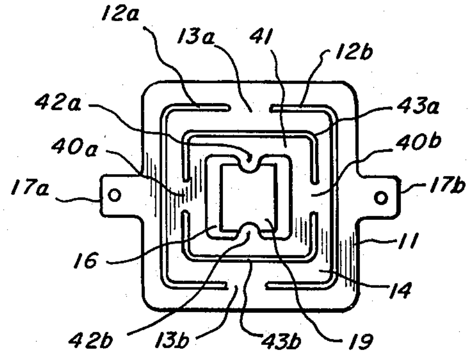
FIG. 4

MECHANICALLY ISOLATED TRANSDUCER HEAD WITH SPRING LOADED ARM FOR FLYING

BACKGROUND OF THE INVENTION

1. The Field of the Invention

This invention is one of a fairly large number of apparatus which have been employed to mount a magnetic transducing head adjacent a moving magnetic recording surface, the head being supported by a pad in turn supported by the air film between the pad and the recording surface. (The term head will be used hereafter to denote both head and the pad in which it is mounted.) A subcombination of the invention allows the incorporation of the invention in a magnetic memory employing a spindle-mounted disc, with the head attached to a head arm which is radially movable with respect to the rotating disc to position the head above any tracks desired. The invention is equally applicable to drum memories as well, whether the head is movable between tracks or not.

The problem alleviated by this invention arose because disc and drum dimensions and spindle bearing runout cannot be controlled accurately enough to prevent small but significant variations in the clearance between the disc and the head during operation. The variations may be very slight, but when dealing as here with head-to-recording-surface clearances less than 40 micro-inches, even minor deviations can be disastrous, because the air film supporting the head assembly adjacent the surface can then be penetrated by the head. When this occurs, the recording surface and head assembly abrade each other and the particles so formed cause even more abrasion to occur in an avalanche effect which soon destroys both recording surface and head assembly. Accordingly, it is necessary to permit the head to move perpendicularly to, and rotate about axes parallel to the recording surface, to maintain the desired clearance between the two. It should be understood that this movement while only a matter of micro-inches, is extremely rapid because of the high disc and drum speeds involved. It is necessary that while the head is shifting to accomodate these changes, it should not be moved from registration with the track beneath it.

In order for the head to follow rapid movements of the recording surface it is necessary first of all that the head and the supporting structure moving with during recording surfaces shifts be as light as possible to decrease mass which must be accelerated by the forces of the air film. Secondly, the head must be suspended very rigidly with respect to its support so as to prevent translation of the head relative to the arm and parallel to the recording surface, as this will interfere with transcribing. Rotation of the head about an axis normal to the recording surface must also be prevented so as to keep the gaps parallel to the individual bit patterns at all times.

To summarize, the head suspension can be considered as a six-degree-of-freedom system. These six degrees are rotation and translation about two orthogonal axes (roll and pitch) parallel to the recording surface, and the axis normal thereto. The ideal mount should have a very low spring rate for rotation of the head about any axis parallel to the recording surface. The spring rate for translation along an axis normal to the recording surface must be controlled quite closely to maintain the proper head-to-surface clearance, and the assembly should have very low sprung weight. On the other hand, the head should be mounted so as to have very high spring rates for translation of the head parallel to the recording surface and in rotation about an axis normal to it.

2. Description of the Prior Art

U.S. Pat. No. 3,586,891 (Applequist et al.) discloses a head arm and head mounting spring in FIGS. 2–6 for use in discs, and is the best known prior art. In the Applequist invention, the head is mounted on gimbal spring 90 which allows for head rotation about axes parallel to the recording surface. However, this gimbal spring results in great stiffness of head motion relative to the arm in a direction normal to the recording surface. Therefore, leaf spring 58 is provided to allow a major portion of the projecting portion of the arm to shift by bending of this lead spring. Thus, the entire arm moves to compensate for shift of the recording surface position normal to itself. This means that a significant amount of mass (that of the arm) must be accelerated by the force created by the air bearing between the recording surface and the head, and results in slower response of the head to changes in recording surface height than is desired. Secondly, because the arm is rotated about an axis parallel to the recording surface and reasonably near the head, rather than translated normal to the surface (rotation about an axis located at infinity) an the head tends to shift slightly transversely to the recording tracks as recording surface height varies. While this type of head mounting is suitable for many applications, the aforementioned reasons prevent its use in many high precision applications.

U.S. Pat. No. 2,518,556 (Kolb et al.) discloses a spring loaded head arm support similar to that in Applequist.

U.S. Pat. No. 3,624,896 (Daubeney et al.) discloses a mounting which causes rotation of a head mounted on inner member 6 during translation of the inner member normal to the plane of the paper in FIG. 1. Such rotations is unacceptable because the head must be supported to keep the core gaps in precise angular orientation with the center line of the track.

BRIEF DESCRIPTION OF THE INVENTION

In accomplishing the specified ends, I employ a gimbal sheet formed from a single thin, approximately square, piece of a resilient material such as steel for attaching a transducing head to a head arm. It is usually flat as well, although this is not necessary. The head arm itself should be as rigid as possible to prevent any appreciable deflection of it during operation. The periphery of the gimbal sheet is attached at mounting points on its opposite edges, to a side of the cantilevered head arm end, so as to be positioned genrally parallel to and adjacent the recording surface, in such a manner that a clearance space between the arm and every part (except for the mounting points) of the gimal sheet exists. This may be easily accomplished, e.g. by mounting the sheet across an opening in the arm end. Two cut-out portions of the sheet define inner edges of an outer or peripheral ring of the sheet, which ring is the element carrying the points attached to the arm. The distance between an outer edge and the adjacent inner edge is preferably several times greater than the thickness of the sheet itself. The entire inner edge of the outer ring is not cut free, but two webs on opposite sides of the sheet remain attached to and integral with the external ring, one on each side of the sheet between the edges attached to the head arm. These webs are free to, in effect, rotate about a pitch axis parallel to the recording surface and passing approximately through the mounting points, by bending of the outer ring.

The webs are also integral with an inner area whose outer edge is defined by the cut out portions previously mentioned. An opening is also present within the inner area which transforms into a ring slightly smaller than the outer ring but having a similar difference between the inner and outer dimensions. The head itself is attached across this opening at two points on the inner ring forming a clearance between itself and all other objects. When so positioned, the head is suspended from the arm by the gimbal sheet and direct contact between the head and arm is, at the most, only through a load spring. The attachment points of the head to the gimbal sheet are to the inner ring and are preferably on a line approximately parallel to the pitch axis.

It can be seen that the head can rotate about a roll axis parallel to the recording surface, and normal to the pitch axis with very little resistance from the gimbal sheet by bending the relatively long cantilvered sides of which the outer and inner rings are comprised. Their relative thinness in the directional normal to the recording surface allows elastic deflection of them quite easily. For this reason, the head can also be easily translated along an axis normal to the recording surface. However, resistance to rotation around this axis is very high since in this case either compression and tension loads are placed on the ring sides, or bending moments about axes normal to the recording surface (the axes of maximum bending stiffness of the cantilevered ring sides) are placed on them. For the same reasons, the gimbal sheet strongly resists translation along the roll and pitch axes. It must be understood that the displacement of the head is contemplated to be never so great as to causes stresses greater than the yield point of the gimbal sheet.

If the gimbal sheet is made laterally symmetrical with respect to both the pitch and roll axes, translation along the axis normal to the recording surface will be perfectly straight line and cause no rotation of the head about this axis. Thus, the head can be expected to precisely follow the recording track beneath it regardless of variations in its height. Furthermore, only a very small amount of mass (portions of the head load spring and the gimbal sheet) in addition to the head is moved whenever the head position is changed. Thus, forces necessary to accelerate the head at a given rate are much smaller than those previously required. This allows the transducing head to be flown closer to the recording surface, a desirable condition, without fear that the head will strike the recording surface due to small changes in its height. The force generated by the air bearing as the height changes is sufficient to accelerate the head away from the recording surface quickly enough to avoid their touching.

Secondly, since the roll and pitch axes are quite close to the air bearing surface of the head, as roll and pitch occurs, translation of the head along axes parallel to the recording surface is minimized. This is particularly important when the head rolls (the roll axis being arbitrarily chosen as the one parallel to the track or its tangent) because this causes translation of the head normal to the data track, and parallel to the recording surface. This lack of registration between the head and track must when the entire arm moves, be compensated for by repositioning of the carriage carrying the arm, and the net result is less precision in head position.

In use, the gimbal sheet suspends the head from a head arm, which in turn positions the air bearing surface of the head properly, adjacent the recording state. The air bearing forces generated between the head and the recording surface require counteracting forces greater than the gimbal sheet can itself transmit, in most cases, to keep the clearance between the head and the recording surface acceptably small. Thus, a head load spring is provided to counteract this force. This spring effectly stiffens motion normal to the recording surface but does not appreciably affect the (torsion) spring rate of the head mount about the roll and pitch axes. The spring force is preferably transmitted to the head through a non-sliding contact with the spring arm which prevents the motion of the spring arm from causing any translation of the head itself. In certain applications, the gimbal sheet may be made stiff enough to counteract the air bearing forces without aid of the load spring, at the cost of somewhat decreased flexibility in roll and pitch.

BRIEF DESCRIPTION OF THE DRAWINGS

FIGS. 1*a* and 1*b* disclose a plan view of two alternatives of a simple embodiment of the gimbal sheet.

FIGS. 2*a*, 2*b*, and 2*c* disclose edge views of the embodiment shown in FIG. 1a in ideal, and certain operating, positions.

FIGS. 3*a*, 3*b*, and 3*c* disclose various views of the gimbal sheet of FIG. 1*a* as mounted in an operable head arm.

FIG. 4 discloses a variation on the gimbal spring of FIG. 1*a*.

DESCRIPTION OF THE PREFERRED EMBODIMENTS

Referring first to FIG. 1*a*, therein is shown in plan view one alternative of a preferred embodiment of gimbal sheet 10. Outer ring 11 has, integral with itself and projecting outwardly therefrom on opposite sides, a pair of mounting tabs 17*a* and 17*b* containing mounting holes 18*a* and 18*b*, by which sheet 10 is affixed to support or arm 9. The inner edge of outer ring 11 is defined by a pair of "C" shaped cut-out areas 12*a* and 12*b* oriented so that the arms of each are directed toward the arms of the other. A pair of webs 13*a* and 13*b* are defined between the end of the arms of cutout areas 12*a* and 12*b* and are integral with outer ring 11. An inner ring 14 is defined by the inner edges of cut-out areas 12*a* and 12*b*. The outer edge of inner ring 14 is defined by the inner edges of cut-out areas 12*a* and 12*b*. The inner edge of inner ring 14 is defined by a pair of cut-out areas 16*a* and 16*b*. Between and defined by cut-out areas 16*a* and 16*b* is a bridge 15 to which head 19, shown in outline, may be attached. Attachment of head 19 to bridge 15 may be done with suitable epoxy-type glue, rivets, or small nuts and bolts. Preferably, gimbal sheet 10 is symmetrical about both a roll axis R and a pitch axis P. FIG. 1*b* shows an alternative shape for the cutout area within inner ring 14 wherein bridge 15 has been replaced by a pair of tabs 15*a* and 15*b*, between head 19, again shown in outline, can be mounted.

To describe the operation of this gimbal sheet, it is convenient to refer to FIGS. 2*a*, 2*b*, and 2*c*, wherein pitch normal (to recording surface 22) axes are denoted by P and N, respectively. FIG. 2*a* discloses the cross-sectional shape of gimbal sheet 10 of FIG. 1*a* when recording surface 22 is in its ideal position. Gimbal sheet 10 is shown mounted between a pair of supports 9, which may be a head arm, by a pair of bolts 21*a* and 21*b* which pass through mounting holes in gimbal sheet 10. Head 10 is affixed in a convenient manner to bridge 15, not shown. In FIG. 2*b*, gimbal sheet 10 is again shown in cross section and deflected downwardly by force F applied to bridge 15. This force can be considered the resultant between the air bearing force and the force of a head load spring, not shown, and occurs when surface 22 is below its ideal position. It should be understood that the deflection shown is exaggerated so as to more clearly shown the shape attained by gimbal sheet 10. This force causes the sides of outer ring 11 integral with tabs 17*a* and 17*b* (as oriented in FIG. 1*a*) to be bent concavely downward and the sides to outer ring 11 adjacent webs 13*a* and 13*b* to be bent convexly downward. The sides of inner ring 14 are bent in opposite fashion, with the sides integral with webs 13*a* and 13*b* bent concavely downward and the sides adjacent bridge 15 bent convexly so. Because of the relative thinness of gimbal sheet 10, the spring rate is very low for small displacements in the normal direction. As can be seen in FIG. 2*b*, rings 11 and 14 can be considered to comprise a series of beams which for the most part bend about easy axes parallel to recording plane 22 in response to distortion of gimbal sheet 10 by force F. However, in response to forces parallel to recording plane 22, bending movements on these beams tend to either bend them in their relatively stiff direction (about the normal) resulting in very small deflections of them, or to load them in tension and compression, again resulting in almost negligible deflections.

FIG. 2*c* discloses in cross section view the distortion of gimbal sheet 10 when subjected to a moment M which attempts to rotate head 19 about roll axis R. Such a moment may occur when recording surface 22 deviates from its ideal angular orientation. Roll axis R is the vertical axis of symmetry of gimbal sheet 10 as shown in FIG. 1*a*. It should be understood that the distortion shown in FIG. 2*c* is also greatly exaggerated so as to more clearly illustrate the operation of gimbal sheet 10. As moment M deflects head 19 in the counterclockwise direction shown, inner ring 14 tends to rotate about the roll axis in the same direction. The side of inner ring 14 adjacent tab 17*a* will be bent convexly down and that adjacent tab 17*b* will be bent convexly up. The sides of inner ring 14 adjacent webs 13*a* and 13*b* will assume a slight "S" shape under the force of this moment and the counteracting moments created by webs 13*a* and 13*b*. The left side of outer ring 11, adjacent tab 17*a* will be bent concavely down and the right-hand side will be bent concavely up. Both sides of outer ring 11 adjacent webs 13*a* and 13*b* will be bent in a "S" shape as well, because of the moments transmitted to them by webs 13*a* and 13*b* and the restraining moments created by tabs 17*a* and 17*b* acting through the sides of outer ring 11.

A similar analysis can be performed for a moment about the pitch axis P (horizontal axis of symmetry in FIG. 1*a*) and shows that rotational deflection about the pitch axis can as easily occur. The ease of deflection for either of these rotations is the same as that for the translation discussed connection with FIG. 2*b*, and results from the relative flexibility of the beams when bent by moments about axes parallel to recording surface 22. A couple tending to rotate head 19 about an axis normal to recording surface 22 will also cause little deflection, because these same beams will be bent by moments perpendicular to the recording plane or they will be placed in tension and compression and hence little appreciable deflection will occur. It should be understood that both translation and rotation can be simultaneously accommodated.

Experience has revealed that certain dimensions and materials are preferred for this gimbal sheet when used in a modern data storage system. The spring is preferably composed of 300 series full hard non-magnetic stainless steel. Thickness can range from 0.0005 inch to 0.01 inch, as thinner stock will result in too fragile a structure, and thicker stock results in greater stiffness of the rings in the easy directions, than desired. The width of the sides comprising each ring should not be less than three times the thickness of gimbal sheet 10, and preferably be as great as possible. This provides for maximum difference between the deflections for a given moment in the easy and hard directions of the beams. The desirability of this implies of course that cut-out areas 12*a* and 12*b* should be as narrow as possible, so as to employ more of the given space as part of rings 11 and 14. It is extremely important, however, that ring 11 be contacted by ring 14 only be webs 13*a* and 13*b*, for any touching at other than these points will drastically affect the flexibility of the gimbal sheet in the desired directions.

In discussing the dimensions of webs 13*a* and 13*b*, it is convenient to think of their width as being along (in FIG. 1*a*) the pitch axis P and their length as being along the roll axis R. The length is, of course, equal to the width of cut-out areas 12*a* and 12*b* adjacent webs 13*a* and 13*b*, and hence is subject to the constraints mentioned above. The width of webs 13*a* and 13*b* should not be, for suitable strength, less than one-twentieth the interior dimension of ring 11. In certain applications, web width can be made as great as one-half the distance between the inner edges of ring 14 parallel to pitch axis P. Gimbal sheet 10 may be attached to both the arm and head 19 by mechanical fastners or special adhesives which adhere strongly to metals and to types of ceramic from which head 19 is made.

It should be understood that many variations in the gimbal sheet are possible without deviating from the basic invention, which is to allow a plurality of nested rings to rotate with elastic deflection of them about orthogonal axes lying in a specified plane. Some obvous variations would be for each of the rings to have oblong rather than square shape in plan view, or to be approximately circular or elliptical in plan view. While the fabrication is much improved by making an entire gimbal sheet unitary, or integral, this of course is not necessary. Webs 13*a* and 13*b* may easily comprise flat strips of metal extending across cut-out areas 12*a* and 12*b* and attaching one ring to the other in this fashion.

FIG. 4 discloses another variant which has three gimbal rings rather than the two shown in FIGS. 1*a*–2*c*. Ring 41 replaces bridge 15 in FIG. 1*a*, with its outer dimension defined by areas 43*a* and 43*b*. Ring 41 is attached to ring 14 by webs 40*a* and 40*b* whose center line approximately corresponds with the center line of tabs 17a and 17b. Head 19 is attached to tabs 42a and 42b extending downwardly and upwardly respectively in cut-out area 16 within ring 41. With the addition of the third ring, the ratio of the spring constant in the stiff direction of the ring sides to that in the easy direction is significantly improved. Advantageous use of this embodiment can be made by increasing the width of webs 13a, 13b, 40a, and 40b, thus increasing the stiffness of the gimbal sheet in the three degrees of freedom where extreme stiffness is desired. There is of course no need to limit the number of gimbal rings to three. Four, five, and even six or more may advantageously employed, each being attached to the ring immediately outside of it by webs that are set along a line normal to the similar set of webs holding this immediately outer ring.

Another alternative is to attach the head to the outermost ring and the gimbal sheet to the arm or mount by the innermost ring. This is not a preferred configuration, but it is mentioned because it does embody the same inventive principals of the apparatus described. It is also possible to use rings of the same or approximately the same size, and replace the integral unitary webs with small stand-offs attaching adjacent rings to each other. This also is not a preferred embodiment because the head is not as close as is desirable to the roll and pitch axes, and hence the head will tend to translate along the axis normal to recording plane 22 and at least one axis perpendicular thereto when roll or pitch of the head occurs.

FIGS. 3a–3c disclose a typical head arm 30 for use in a disc data recording system. Head arm 30 comprise a rigid beam or strut 53 which carries apparatus for positioning head 19 adjacent disc recording medium 36 (FIG. 3c), and for lifting head 19 away from disc recording medium 36. In general, the more rigid beam 53 is, the better, since the intent is for the head mount to provide all of the flexibility for head movement, and beam 53 to provide none, thereby avoiding problems described earlier, such as high sprung mass. Strut 53 is mounted on a carriage (not shown) which is adapted to position itself at selected radii from the spindle of disc 36 in response to position signals. Arm 30 is so located on the carriage that head 19 will be placed above any desired recording track when the carriage is so properly positioned.

Turning to FIGS. 3a and 3b, gimbal sheet 10 is positioned across an opening at the end of strut 53 and fastened in this position by screws 21a and 21b. Head 19 is carried by gimbal sheet 10 so that during normal operation, head 19 is positioned extremely close to recording plane 22, as shown in FIG. 3c. Head 19 is urged toward recording plane 22 by the action of coil springs 32a and 32b which have static spring arms 33a and 33b which bear against strut 53 and movable arms 34a and 34b which bear against flex strip 37, but do not touch pressure arm 39 at any other point. Coil springs 32a and 32b are mounted on shaft 35, which is affixed to strut 53 in a convenient manner. Pressure arm 39 is also pivoted on shaft 35 and has within an opening 36, a flex strip 37, which is attached to head 19 at a fixed point in a convenient manner. Movable spring arms 34a and 34b bear against the top side of flex strip 37, and thereby transmit force to head 19 necessary to hold it sufficiently close to recording plane 22 to counteract the force of the air bearing between the two, and permit efficient data recording. Flex strip 37 is flexible enough to compensate for any tendency of spring arms 34a and 34b to translate with respect to head 19.

When it is necessary to lift head 19 away from recording plane 22, arm 30 must be withdrawn from disc recording medium 36. This corresponds to a movement of arm 30 to the right in FIG. 3c. Lift arm 50 is effectively pivotable by flexing of itself in flex areas 51a and 51b. When it is desired to lift head 19 from recording plane 22, the carriage is made to move arm 30 to the right as shown by the arrow in FIG. 3c. When head 19 approaches the edge of disc recording medium 36 camming surfaces 52a and 52b strike cams 54 causing arm 50 to be flexed at flex areas 51a and 51b and be lifted upwardly and away from recording plane 22, the directions of these movements referring to FIG. 3c. The upward motion of lift arm 50 causes a portion of it to strike tabs 31a and 31b and lift pressure arm 39 away from head 19. As flex strip 37 is attached to head 19, it physically lifts head 19 along with pressure arm 39 and positions head 19 away from recording plane 22. It is also possible that flex strip 37 be designed to merely bear against head 19, and gimbal sheet 10 be designed with an unstressed shape which tends to lift head 10 away from recording plane 22 when pressure arm 39 is lifted. In this case, flex strip 37 need not be attached to head 19, but need only bear downwardly against it to provide the necessary force for counteracting the air bearing resistance.

Flex strip 37 must be positioned so as to bear downwardly on head 19 at a point almost precisely in line with the center of effort of the air bearing beneath head 19. This prevents head 10 from being tilted by the couple which would otherwise be present. Flex strip 37 is provided so that as the head rides slightly up and down with changes in the position of recording surface 22, the movement between spring arms 34a and 34b and head 19 will not transmit any significant force to head 19 other than force directly normal to recording plane 22. These forces, which instead bend flex strip 37 slightly, result from the circular arc which the end of movable spring arms 34a and 34b and pressure arm 39 move through during rotation. Thus, if either pressure arm 39 or movable spring arms 34a and 34b were directly and fixedly attached to a point on head 19, gimbal sheet 10 would be placed in stress, and head 19 would tend to shift slightly lengthwise along arm 30 as head 19 translated along the normal axis. It is true that head 19 would be shifted along arm 30 only an infinitesimal amount, but this amount, measurable in microinches, is significant in high precision apparatus.

It should be understood that the foregoing approach employing the gimbal sheet is certainly not the only means for achieving the basic improvement of this invention. To repeat, this invention is directed toward providing certain desirable characteristics in the mounting for attaching a magnetic head assmebly to the structure which supports and positions it. The mounting must be relatively flexible with respect to rotation about the axes parallel to the recording surface and with respect to translation of the head perpendicular to the recording surface. The mounting should, on the other hand, be rigid or inflexible with respect to rotation of the head assembly about the axis normal to the recording surface, and with respect to translation along axes parallel to the recording surface, relative to the support. The support itself should also be rigid so as to decrease to an absolute minimum the amount of mass accelerated whenever the head changes position during normal use. Applicant believes that invention lies in the mere discovery or realization of the advantages of mountings which performs these functions. Therefore, a metal bellows might be employed in place of the gimbal sheet to accomplish the required ends. Certain disadvantages from an engineering standpoint may exist such as fatigue of the bellows over a period of many cycles of operation. A bellows arrangement would also tend to be more expensive than employing a gimbal sheet. But a bellows is a means for achieving the ends of this invention. There may also be other structures by which the aims and purposes this invention may be realized. Applicant wishes to include all these various means for accomplishing these ends as a part of his invention.

Having thus described my invention, what I desire to claim by letters patent is:

1. Apparatus for supporting a magnetic head adjacent a recording surface for transcribing thereon, comprising a. a rigid cantilevered arm;

b. a thin resilient gimbal sheet having external shape and interior openings defining a first ring attached to the cantilevered arm at substantially opposite points on the first ring and a second ring spaced apart from the first and attached to it by a pair of webs intersecting the first ring at opposite interior edges between the points at which the first ring is attached to the cantilevered arm, said second ring attached to the magnetic head at a point between the two webs;

c. a pressure arm mounted for rotation on the cantilevered arm in a position permitting its rotation to a position contacting the head on the side opposite that of the transducing surface of the head; and d. a spring loaded arm rotatably attached to the cantilevered arm and rotatably pressing against the pressure arm to force it toward the head.

2. The apparatus of claim 1, including a lift arm attached to the cantilevered arm and rotatable with respect thereto from a first position out of contact with the pressure arm to an intermediate position contacting a face of the pressure arm facing the head, and rotatable past the intermediate position to a second position displacing the pressure arm from its position when the lift arm is in its first position; means for causing the lift arm to rotate from its first position to its second position; and means for causing the head to maintain contact with the pressure arm for at least a portion of the time during which the lift arm moves from its intermediate to its second position.

3. The apparatus of claim 2, wherein the lift arm further comprises a flex area rotatably attaching the lift arm to the cantilevered arm;

and wherein the lift arm rotating means comprises:

a. means for linearly shifting the cantilevered arm between an operating position and a retracted position;

b. a camming surface on the lift arm obliquely facing toward the retracted position and away from the second lift arm position; and c. a cam fixed with respect to the cantilevered arm motion between the operating and retracted position, in a position allowing it to be struck by the camming surface while the cantilevered arm is moved to its retracted position.

4. The apparatus of claim 3, wherein the means for causing the head to maintain contact with the pressure arm comprises means attaching the head to the pressure arm.

5. The apparatus of claim 3, wherein the means for causing the head to maintain contact with the pressure arm comprises means mounting the gimbal sheet in a position causing the gimbal sheet to become less distorted from its mechanically unstressed position while the lift arm rotates from its intermediate to its second position.

* * * * *